US006811219B2

(12) United States Patent
Hudswell et al.

(10) Patent No.: US 6,811,219 B2
(45) Date of Patent: Nov. 2, 2004

(54) PASSENGER SEAT (75) Inventors: Michael Hudswell, Mapperley Plains (GB); Robert George Lovell, Farnham (GB)

(73) Assignee: Britax Excelsior Limited, Gallows Hill (GB)

( * ) Notice: Subject to any disclaimer, the term of this patent is extended or adjusted under 35 U.S.C. 154(b) by 0 days.

(21) Appl. No.: 10/286,705

(22) Filed: Oct. 31, 2002

(65) Prior Publication Data

US 2003/0085601 A1 May 8, 2003

(30) Foreign Application Priority Data

Nov. 2, 2001 (GB) .............................................. 0126310

(51) Int. Cl.⁷ ................................................ A47C 1/02
(52) U.S. Cl. ............... 297/312; 297/452.39; 297/284.3; 297/331
(58) Field of Search ........................... 297/312, 452.39, 297/284.3, 331

(56) References Cited

U.S. PATENT DOCUMENTS

| 1,516,811 A | * | 11/1924 | Edwards ................... 297/284.3 |
| 3,632,166 A | | 1/1972 | Lohr ........................... 297/284 |
| 4,765,679 A | * | 8/1988 | Lanuzzi et al. ........... 297/300.3 |
| 4,775,185 A | | 10/1988 | Scholin et al. |
| 4,966,413 A | * | 10/1990 | Palarski ....................... 297/330 |
| 5,195,802 A | | 3/1993 | Hayakawa et al. .......... 297/335 |
| 5,401,077 A | * | 3/1995 | Hosoe ......................... 297/312 |
| 5,597,203 A | * | 1/1997 | Hubbard ................... 297/284.3 |
| 5,788,015 A | | 8/1998 | Seng et al. ................. 187/222 |

FOREIGN PATENT DOCUMENTS

| DE | 40 39 100 | 6/1992 | |
| EP | 0 723 890 | 7/1996 | |
| EP | 0 723 890 A3 | 7/1996 | ............ B60N/2/24 |
| GB | 811898 | 4/1959 | |
| GB | 2 232 078 | 12/1990 | |
| GB | 2 299 265 | 10/1996 | |
| JP | 58-36732 | * 3/1983 | |
| JP | 58097529 | 6/1983 | ............ B60N/1/06 |
| JP | 8-142727 | 4/1996 | |
| JP | 08132942 | 5/1996 | ............ B60N/2/34 |
| JP | 9-118159 | 6/1997 | |
| JP | 2000333764 | 12/2000 | ............ B60N/2/02 |

* cited by examiner

Primary Examiner—Laurie K. Cranmer
(74) Attorney, Agent, or Firm—Davis & Bujold, P.L.L.C.

(57) ABSTRACT

A vehicle seat comprises a base frame including front and rear transverse support members, a backrest, and a seat pan. The seat pan has a rear part mounted on the transverse support members adjacent to the backrest for angular movement about a transverse horizontal axis and a front part which is mounted for angular movement relative to the rear part between a position in which its top surface is co-planar with the top surface of the rear part and a position in which the front edge of the front part is lower than its rear edge when the rear part is substantially horizontal. The distance between the front transverse support member and the rear edge of the rear part of the seat pan is less than two thirds (preferably less that half) of the distance between the front edge of the front part of the seat pan and the rear edge of the rear part of the seat pan, in order to leave room for a seat occupant to stand upright when the seat pan is raised.

9 Claims, 7 Drawing Sheets

PASSENGER SEAT

FIELD

This invention relates to a vehicle seat of the type comprising a base frame including front and rear transverse support members, a backrest, and a seat pan having a rear part mounted on said transverse support members adjacent to the backrest for angular movement about a transverse horizontal axis and a front part which is mounted for angular movement relative to the rear part between a position in which its top surface is co-planar with the top surface of the rear part and a position in which the front edge of the front part is lower than its rear edge when the rear part is substantially horizontal.

RELATED ART

DE-A-4039100 discloses a seat of this type in which the front part of the seat pan serves as a leg rest. A seat in which the front part of the seat pan serves as a thigh support is described in GB-A-2232078.

For medical reasons, it is undesirable for passengers to remain seated in one position for long periods of time. Obviously, it is undesirable for large numbers of passengers in an aircraft to leave their seats at the same time. Particularly in economy class seating, the scope for passengers to move while remaining in their seats is severely limited. It is an object of the present invention to provide a seat with enhanced possibilities for a passenger to move without leaving the immediate vicinity of the seat.

SUMMARY OF THE INVENTION

According to the invention, in a vehicle seat of the type described above, the distance between the front transverse support member and the rear edge of the rear part of the seat pan is less than two thirds of the distance between the front edge of the front party of the seat pan and the rear edge of the rear part of the seat pan.

BRIEF DESCRIPTION OF THE DRAWINGS

An embodiment of the invention will now be described, by way of example, with reference to the accompanying drawings, in which.

DETAILED DESCRIPTION OF THE PREFERRED EMBODIMENT

Figure 1:
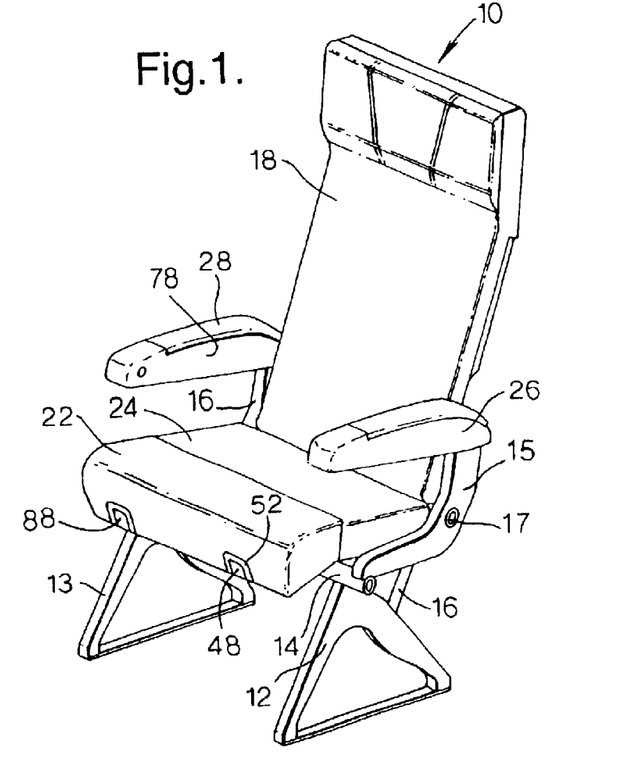
FIG. 1 is a perspective view of an aircraft passenger seat in accordance with the invention.

Referring to FIG. 1, an aircraft passenger seat 10 comprises a base frame including a pair of triangular legs 12 and 13 interconnected by a front tubular transverse support member 14. A pair of L-shaped armrest supports 15 and 16 extend rearwardly from the front transverse support member 14 and support a rear tubular transverse support member 17 which extends parallel to the front transverse support member 14. A respective support member 16 extends upwardly from each leg 12, 13 to further support the rear transverse support member 17.

If the seat 10 is part of a double or triple seat assembly, there will be only one pair of legs 12 and 13, one front transverse support member 14 and one rear transverse support member 17 for such a seat assembly.

A backrest 18 is mounted on the rear transverse support member 17 and is provided with a recline mechanism which is of a conventional type and will not be described in detail. A seat pan having a front part 22 and a rear part 24 is mounted on the front and rear transverse support members 14 and 17. The overall size of the seat pan is such that the distance between the front transverse support member 14 and the rear edge of the rear part 24 of the seat pan is less than two thirds (preferably less that half) of the distance between the front edge of the front part 22 of the seat pan and the rear edge of the rear part 24 of the seat pan. A pair of arm rests 26 and 28 are mounted on respective armrest supports 15 and 16.

Figure 2:
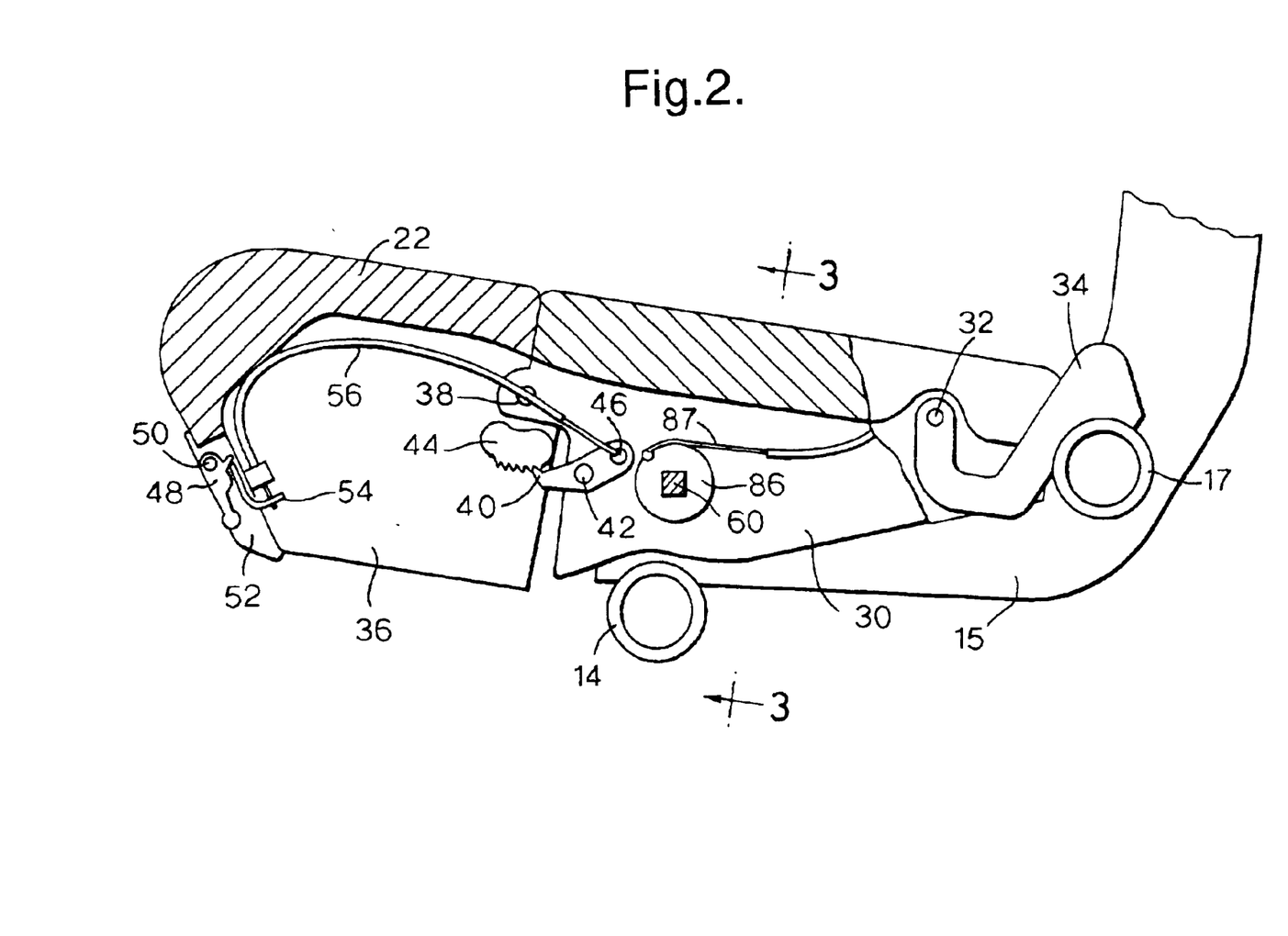
FIG. 2 is a schematic longitudinal sectional view of the seat pan of the seat shown in FIG. 1 in its lowest position.

Referring to FIG. 2, the rear part 24 of the seat pan has downwardly extending side flanges 30 (one of which is visible in FIG. 2). A pair of pivot pins 32 extend through respective flanges 30 and are secured to respective projections 34 on the rear transverse support member 17 thus pivotally supporting the rear edge of the rear part 24 of the seat pan. A gas strut (not shown) biases the front edge of the rear part 24 upwardly.

The front part 22 of the seat pan has two side flanges 36, each of which is connected by a respective pivot pin 38 to the corresponding flange 30 of the rear part 24 of the seat pan. A respective pawl 40 is mounted by a pivot pin 42 on each of the flanges 30 and engages with a ratchet projection 44, which is secured to the corresponding flange 36. When engaged with their ratchet projections 44, the pawls 40 resist angular movement of the front part 22 of the seat pan about the pivot 48 in the counter-clockwise direction as viewed in FIG. 2. The pawls 40 are linked by a cross-shaft 46 and biased by springs (not shown) into their engaged positions.

A lever 48 is mounted on a pivot pin 50 in a recess 52 in the front edge of the seat pan 22. The lever 56 has an integral L-shaped arm 54 which is linked by a Bowden cable 56 to the cross-shaft 46 adjacent to one of the pawls 50. When the lever 48 is pulled forwardly and outwardly from the front edge of the seat pan 22, the cable 56 pulls the pawls 40 out of engagement with their ratchet projections 44 so as to allow the front edge of the front part 22 of the seat pan to be lowered relative to the rear part 24.

Figure 3:
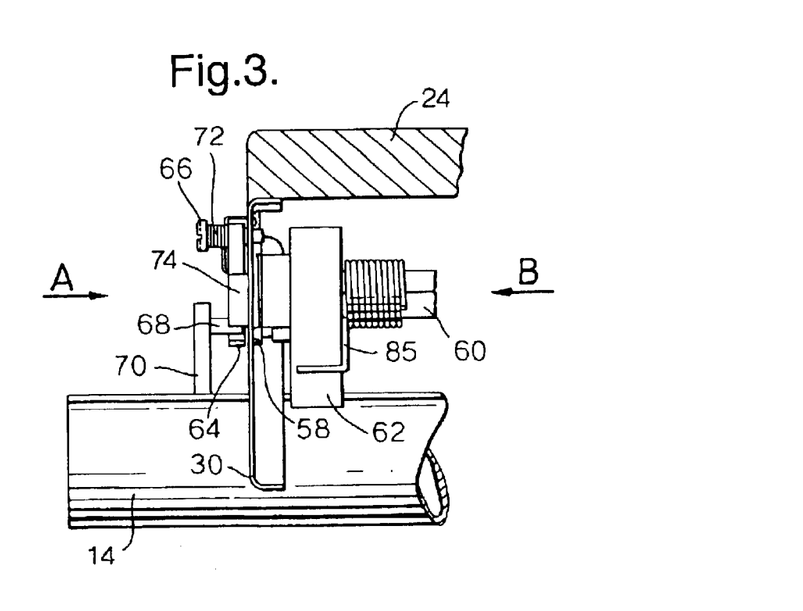
FIG. 3 is a scrap section taken on the line 3—3 in FIG. 2.

Immediately above the front transverse support member 14, each flange 30 carries a respective bearing 58 (FIG. 3) for a respective end of a shaft 60, which is of square cross-section (except for the portion thereof received in the bearings). A cam 62 is mounted on the shaft 60 inboard of the flange 30 so as to rest on the upper surface of the front transverse support member 14. As can also be seen in FIG. 4, a hook 64 has its straight end pivotally mounted on a screw 66 so that its hooked end can engage round a stud 68 projecting from a support 70 extending upwardly from the front transverse member 14. A torsion spring 72 biases the hook 64 into engagement with the stud 68 (counter-clockwise as viewed in FIG. 4) so as to hold the front edge of the rear part 24 of the seat pan in its lowest position. A cam formation 74 on the end of the shaft 60 engages with the hook 64 to move it out of engagement when the shaft 60 is turned in the counter-clockwise direction as viewed in FIG. 4.

Figure 5:
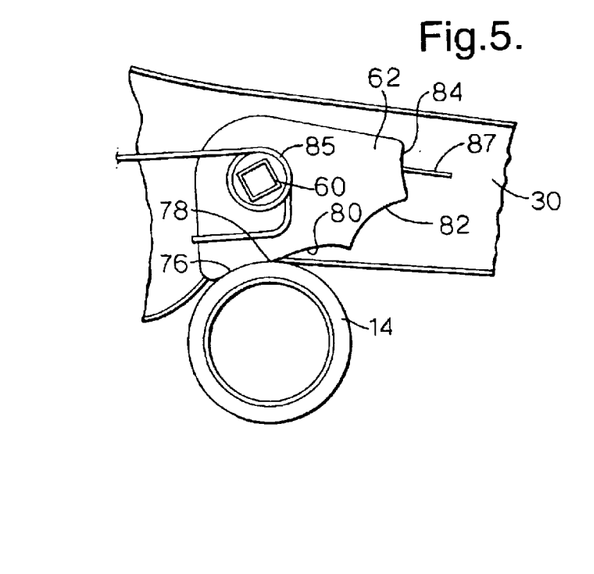
FIG. 5 is a view taken in the direction of the arrow B in FIG. 3.

As can be seen in FIG. 5, the cam 62 has a first concave portion 76 separated by a convex portion 78 from a second concave portion 80. The convex portion 78 is of cylindrical form centred on the axis of the shaft 60. Adjacent to the second concave portion 80, the cam also includes a third concave portion 82 and a fourth concave portion 84 spaced at increasing distances from the axis of the shaft 60. A torsion spring 85 (FIG. 3) biases the cam 62, and with it the shaft 60, in the counter-clockwise direction as viewed in FIGS. 2 and 5. A similar cam and hook assembly is mounted on the other flange 30 and includes a bearing to support the other end of the shaft 60.

Reverting to FIG. 2, a pulley 86 is mounted at a central location on the shaft 60 between the two cam and hook assemblies. The pulley 86 has one end of a Bowden cable 87 connected to its periphery. The other end of the cable 87 is connected to a lever 88 mounted in the front edge of the front part 22 of the seat pan. The lever 88 is similar handle 48 and operates in a similar manner to pull on the cable 87 so as to cause clockwise rotation of the shaft 60 in opposition to the torsion springs 85 of the two cam and hook assemblies.

Figure 4:
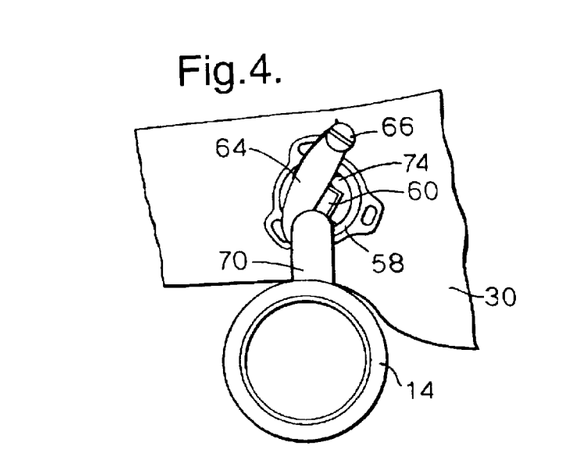
FIG. 4 is a view taken in the direction of the arrow A in FIG. 3.
Figure 6:
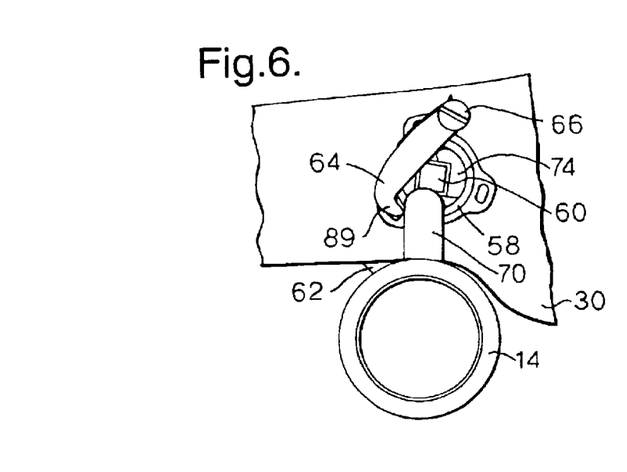
FIGS. 6 and 7 are views corresponding to FIGS. 4 and 5 but showing the mechanism in a position just prior to raising the front edge of the rear part of the seat pan.
Figure 7:
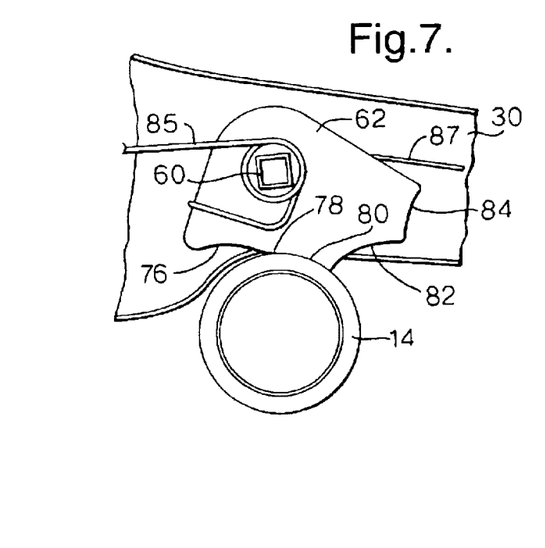

FIGS. 4 and 5 show the front edge of the rear part 24 of the seat pan in its lowest position. When it is desired to raise the front edge of the rear part 24, the lever 88 is pulled outwardly so as to pull on the Bowden cable 87, causing the shaft 60 to rotate in the clockwise direction as viewed in FIGS. 2 and 5 (the counter-clockwise direction as viewed in FIG. 4). Initial movement of the shaft 60 from the position shown in FIGS. 4 and 5 to the position shown is FIGS. 6 and 7 moves the point of contact between the cam 62 and the front transverse support member 14 along the convex portion 78. Since this is centred on the axis of the shaft 16, there is no resulting upward movement of the front edge of the rear pan portion 24. However the cam formation 74 pushes the hook 64 in the clockwise direction, as viewed in FIGS. 4 and 6, disengaging it from the stud 68. The seat pan is now free to move upwards.

Figures 8, 9, 10, 11:
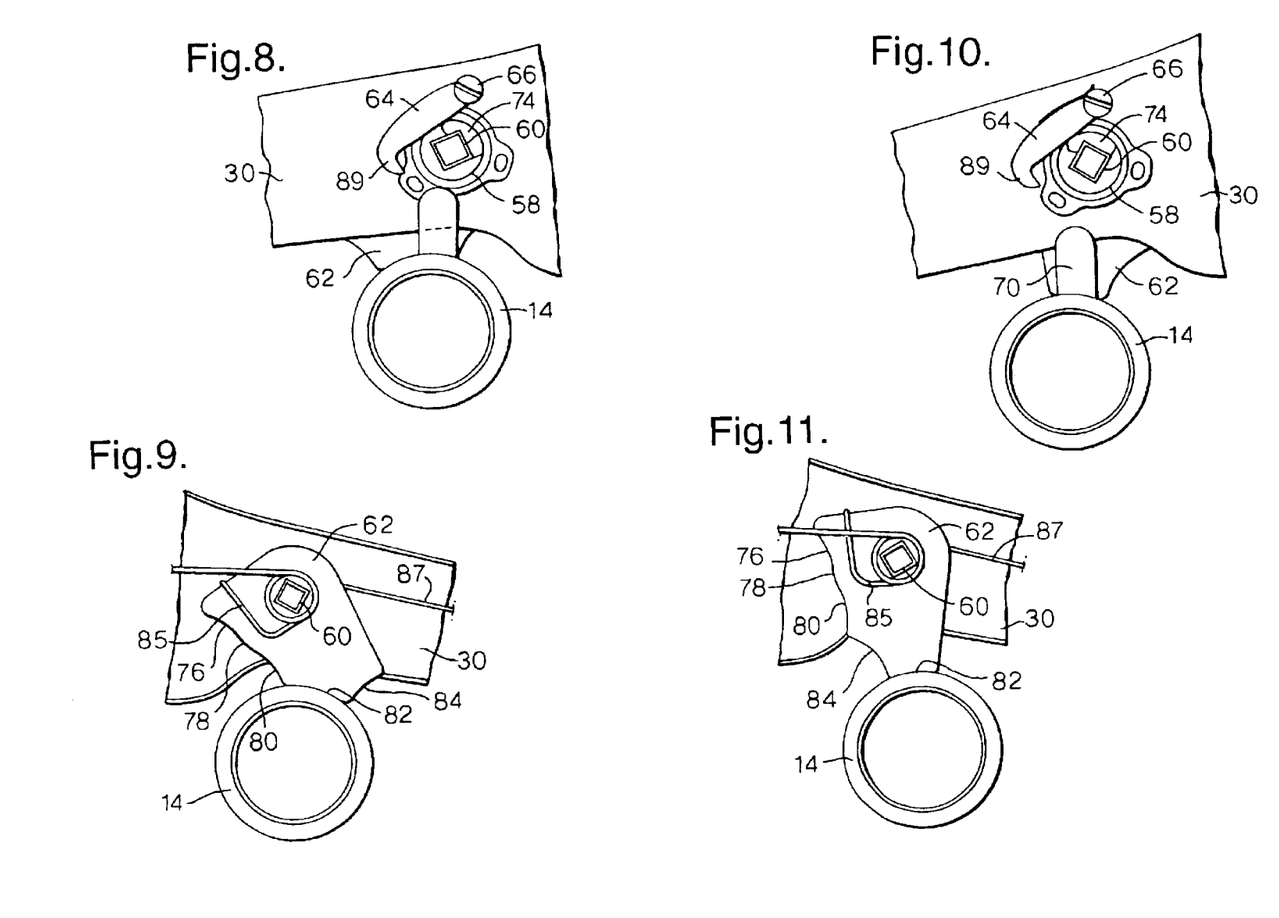
FIGS. 8 and 9 are views corresponding to FIGS. 4 and 5 showing the mechanism in an intermediate raised position.
FIGS. 10 and 11 are views corresponding FIGS. 4 and 5 showing the mechanism in a fully raised position.

Further angular movement of the shaft 60 brings the point of contact between the cam 62 and the transverse member 14 into the third concave portion 82 in which the front edge of the seat pan 24 is supported at an intermediate raised position as shown in FIGS. 8 and 9.

Continued angular movement of the shaft 60 brings the point of contact between the cam 62 and the transverse support member 14 into the concave portion 84. The seat pan is now in its highest supported position. It can be raised further by hand to a substantially vertical position abutting the backrest 18.

Figure 12:
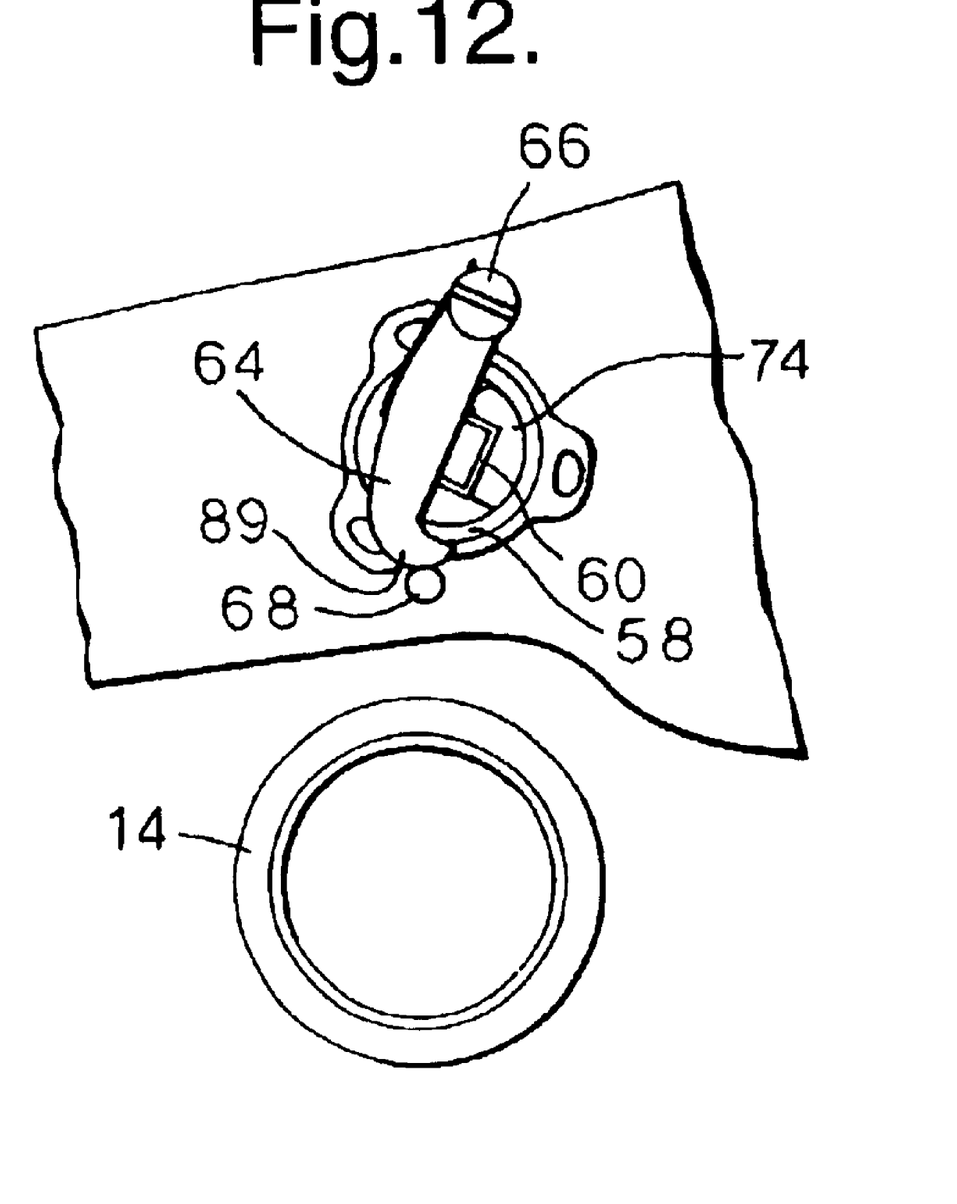
FIG. 12 is a view corresponding to FIG. 4 showing the mechanism as it moves towards its lowemost position.

When the seat is lowered to its original position, a curved formation 89 on the end of the hook 64 serves as a cam to displace it round the stud 68, as shown in FIG. 12.

Figure 13:
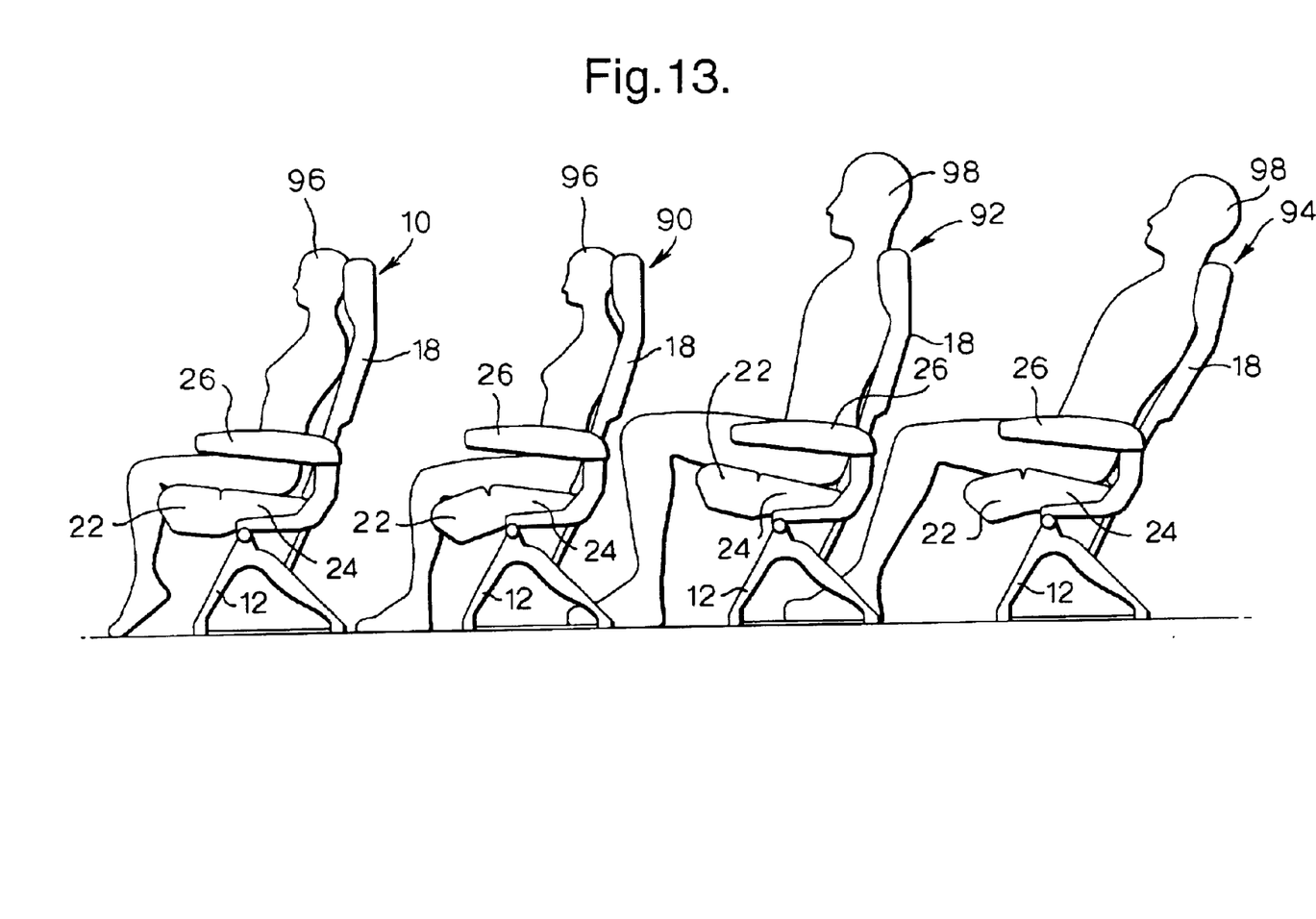
FIG. 13 is a schematic side view of four seats of the type shown in FIG. 1, positioned one behind the other and with each seat in a different configuration.

FIG. 13 shows the seat 10 and three other seats 90, 92 and 94 which are identical to the seat 10, positioned one behind the other as they would be in an aircraft, for example at a pitch of 32 inches (813 mm). The various component parts of the seats 90, 92 and 94 will be denoted by the same reference numerals as the corresponding parts of the seat 10.

In FIG. 13, the seat 10 is shown in its normal position with the backrest 18 upright and the two parts of the seat pan 22 at about 7° to the horizontal and level with one another. The seat is occupied by a female of height equal to that of the fifth percentile of the female population. As can be seen, the occupant 96 is unable to place her heels on the floor with the result that the weight of her lower legs is supported by engagement of the backs of her thighs with the front part 22 of the seat pan.

The next seat 90 is also occupied by a fifth percentile female 96. In this seat, the front part 22 of the seat pan has been pivoted downwards by disengaging the pawl 50 (FIG. 2) so as to allow the occupant 96 to place her heels on the floor.

The seat 92 is in its normal position with the backrest 18 upright and the two parts 22 and 24 of the seat pan coplanar with one another and tilted up by the cams 38 (FIG. 2). The seat is occupied by a ninety fifth percentile male 98. With the front part 22 of the seat pan in its upper position, the thighs of the occupant 98 are supported while his heels rest on the floor.

The seat 94 has its backrest 18 in the maximum reclined position and the rear part 24 of the seat pan tilted up. Lowering the front part of the seat pan 22 allows the seat to be occupied by the ninety fifth percentile male 98 with his feet as far forwards as the seat pitch allows.

Figure 14:
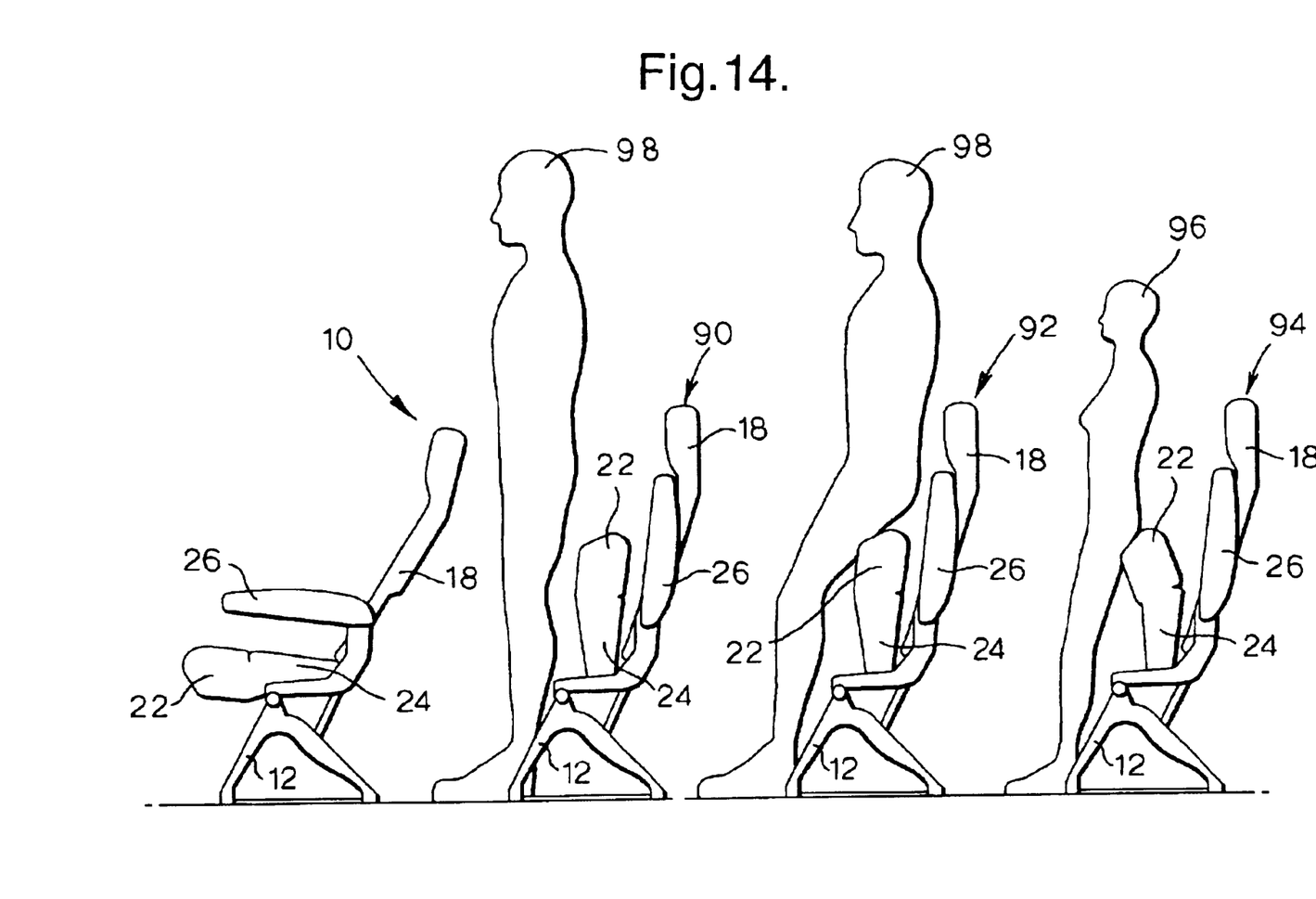
FIG. 14 is a side view of the four seats shown in FIG. 4 but in different configurations.

Referring now to FIG. 14, the seat 10 is shown as unoccupied by with its backrest 18 reclined to its maximum extent. The seat 90 has its entire seat pan 22, 24 pivoted about its pivot pins 32 to a substantially vertical position. Because the front transverse support member is set back from the front edge of the front part 22 of the seat pan, there is then adequate room for the ninety fifth percentile male 98 to stand up with his legs straight. If he wishes, such an occupant 98 can "perch" on the front edge of the front part of the seat pan 22 as illustrated for the seat 92. The fifth percentile female 96 may take up a similar "perched" position after disengaging the pawl 50 and folding the front part of the seat pan 22 forwards as illustrated for the seat 94.

Accordingly, the invention provides a passenger seat which can be occupied comfortably in a variety of different positions by passengers of a wide range of heights.

What is claimed is:

1. A vehicle seat comprising a base frame including front and rear transverse support members, a backrest, and a seat pan having a rear part mounted on said transverse support members adjacent to the backrest for angular movement about a transverse horizontal axis and a front part which is mounted for angular movement relative to the rear part between a position in which a top surface of the front part is co-planar with the top surface of the rear part and a position in which the front edge of the front part is lower than a rear edge of the front part when the rear part is substantially horizontal, a distance between the front transverse support member and the rear edge of the rear part of the seat pan is less than two thirds of a distance between the front edge of the front part of the seat pan and the rear edge of the rear part of the seat pan and the rear part of the seat pan is pivotable to a position abutting the backrest in which the front edge of the front part of the seat pan forms a seating surface.

2. The vehicle seat according to claim 1. wherein the front part of the seat pan is pivotable forwardly while the rear part is abutting the backrest, thereby to reduce the effective height of said seating surface.

3. The vehicle seat according to claim 1, wherein the distance between the front transverse support member and the rear edge of the rear part of the seat pan is less than half of the distance between the front edge of the front part of the seat pan and the rear edge of the part of the seat pan.

4. A vehicle seat comprising a base frame including front and rear transverse support members, a backrest, and a seat pan having a rear part mounted on said transverse support members adjacent to the backrest for angular movement about a transverse horizontal axis and a front part which is mounted for angular movement relative to the rear part between a position in which a top surface of the front part is co-planar with the top surface of the rear part and a position in which the front edge of the front part is lower than a rear edge of the front part when the rear part is substantially horizontal, a distance between the front transverse support member and the rear edge of the rear part of the seat pan is less than two thirds of a distance between the front edge of the front part of the seat pan and the rear part of the seat pan, further comprising drive means for moving the front edge of the rear part of the seat pan between a normal position and a raised position and a latch for securing the rear part of the seat in its normal position.

5. The vehicle seat according to claim 4, wherein the front of the seat pan is co-planar with the rear part when the rear part of the seat pan is in its raised position.

6. The vehicle seat according to claim 4, wherein the front part of the seat pan has its front edge lowered when the rear part of the seat pan is in its raised position.

7. The vehicle seat according to claim 4, wherein the distance between the front transverse support member and the rear edge of the rear part of the seat pan is less than half of the distance between the front edge of the front part of the seat pan and the rear edge of the rear part of the seat pan.

8. A vehicle seat comprising a base frame including front and rear transverse support members, a backrest, and a seat pan having a rear part mounted on said transverse support members adjacent to the backrest for angular movement about a transverse horizontal axis and a front part which is mounted for angular movement relative to the rear part between a position in which a top surface of the front part is co-planar with the top surface of the rear part and a position in which the front edge of the front part is lower than a rear edge of the front part when the rear part is substantially horizontal, wherein the rear part of the seat pan is pivotable to a position abutting the backrest in which the front edge of the front part of the seat pan forms a seating surface.

9. The vehicle seat according to claim 8, wherein the front part of the seat pan is pivotable forwardly while the rear part is abutting the backrest, thereby to reduce the effective height of said seating surface.

* * * * *